US009450268B2

(12) United States Patent
Sato et al.

(10) Patent No.: US 9,450,268 B2
(45) Date of Patent: Sep. 20, 2016

(54) METHOD FOR PRODUCING AND APPARATUS FOR PRODUCING SECONDARY BATTERY

(75) Inventors: Hiroshi Sato, Tokyo (JP); Seiji Yamaura, Nagano (JP)

(73) Assignees: ELIIY POWER CO., LTD., Tokyo (JP); NAGANO AUTOMATION CO., LTD., Nagano (JP)

( * ) Notice: Subject to any disclaimer, the term of this patent is extended or adjusted under 35 U.S.C. 154(b) by 412 days.

(21) Appl. No.: 14/112,764

(22) PCT Filed: Apr. 18, 2011

(86) PCT No.: PCT/JP2011/059566
§ 371 (c)(1),
(2), (4) Date: Dec. 12, 2013

(87) PCT Pub. No.: WO2012/144007
PCT Pub. Date: Oct. 26, 2012

(65) Prior Publication Data
US 2014/0230239 A1 Aug. 21, 2014

(51) Int. Cl.
*H01M 2/14* (2006.01)
*H01M 10/16* (2006.01)
*H01M 10/04* (2006.01)
*H01M 10/0583* (2010.01)

(52) U.S. Cl.
CPC ....... *H01M 10/045* (2013.01); *H01M 10/0404* (2013.01); *H01M 10/0459* (2013.01); *H01M 10/0583* (2013.01); *Y10T 29/49108* (2015.01); *Y10T 29/53135* (2015.01)

(58) Field of Classification Search
CPC .......... H01M 10/0404; H01M 10/04; H01M 10/0459; H01M 10/0435
USPC .............................................. 29/623.1, 623.5
See application file for complete search history.

(56) References Cited

U.S. PATENT DOCUMENTS

2009/0165936 A1    7/2009  Sakata et al.

FOREIGN PATENT DOCUMENTS

| JP | 2000-340217 | 12/2000 |
| JP | 2004-022449 | 1/2004 |
| JP | 2009-140772 | 6/2009 |
| JP | 2009-140775 | 6/2009 |
| JP | 2009140707 | 6/2009 |
| JP | 2009-158317 | 7/2009 |

OTHER PUBLICATIONS

Extended European search report, dated Oct. 24, 2014, in corresponding European Patent Application No. 11864023.4.
International Search Report, PCT/JP2011/059566, Jul. 26, 2011.

*Primary Examiner* — Patrick Ryan
*Assistant Examiner* — Julian Anthony
(74) *Attorney, Agent, or Firm* — Young & Thompson (57) ABSTRACT

A production apparatus is equipped with a supply unit which has a cassette member 50 for bearing a predetermined number of positive electrode plates or negative electrode plates, and which batchwise supplies a plurality of positive electrode plates 5 or negative electrode plates 6 placed on the cassette member 50 to respective electrode plate conveying trays 19 of an electrode plate conveying member 20.

20 Claims, 11 Drawing Sheets

METHOD FOR PRODUCING AND APPARATUS FOR PRODUCING SECONDARY BATTERY

TECHNICAL FIELD

This invention relates to a method for producing and an apparatus for producing a secondary battery for use in vehicles, electric equipment, etc.

BACKGROUND ART

A secondary battery such as a lithium ion secondary battery has an electrode plate group formed by superposing positive electrode plates and negative electrode plates alternately such that separators are interposed between the positive electrode plates and the negative electrode plates. As one of devices for producing such an electrode plate group, a zigzag stack type production device is available in which a continuous body of the separator is folded zigzag, the positive electrode plates and the negative electrode plates are inserted into the respective furrows of the folded separator, and the resulting composite is crushed flat (see, for example, Patent Document 1).

PRIOR ART DOCUMENTS

Patent Documents

Patent Document 1: JP-A-2004-22449

SUMMARY OF THE INVENTION

Problems to be Solved by the Invention

Such a production device in a zigzag stack mode can improve the positional accuracy of the positive and negative electrode plates and the separator, and can shorten tact time, as compared with, for example, a stack mode manufacturing device in which positive electrode plates, negative electrode plates, and separators each shaped in the form of a sheet are alternately stacked such that each separator is interposed between the adjacent positive electrode plate and negative electrode plate. With the production of the electrode plate group, however, it is desired that the positional accuracy of the positive and negative electrodes and the separator be further improved and that the tact time be further shortened.

The manufacturing method described in Patent Document 1, for example, comprises holding a continuous separator between a pair of rollers, reciprocating the pair of rollers in a horizontal direction to fold the separator zigzag, and placing the positive and negative electrode plates alternately on the separator each time the pair of rollers makes a reciprocating motion. In this case, it is difficult to shorten the tact time markedly.

The present invention has been accomplished in the light of the above-mentioned circumstances. It is an object of the present invention to provide a method for producing and an apparatus for producing a secondary battery which can improve the positional accuracy of the positive and negative electrodes and the separator and can shorten the tact time.

Means for Solving the Problems

A first aspect of the present invention, designed to solve the above-described problems, lies in a method for producing a secondary battery, comprising: an electrode plate placing step of placing a predetermined number of positive electrode plates or negative electrode plates on a positive electrode plate or negative electrode plate cassette member; an electrode plate supply step of batchwise supplying the predetermined number of positive electrode plates or negative electrode plates placed on the positive electrode plate or negative electrode plate cassette member to an electrode plate conveying member for positive electrode plates or negative electrode plates; a zigzag folding step of pushing a separator by a plurality of guide members to fold the separator zigzag; a multilayer body formation step of inserting the positive electrode plates placed on the electrode plate conveying member for positive electrode plates and the negative electrode plates placed on the electrode plate conveying member for negative electrode plates into respective furrows of the zigzag-folded separator to form a multilayer body having the positive electrode plates and the negative electrode plates superposed alternately via the separator; a withdrawal step of withdrawing the guide members from inside the respective furrows of the separator; and a pressing step of pressing the multilayer body in a direction in which the positive electrode plates and the negative electrode plates are stacked.

A second aspect of the present invention lies in a method for producing a secondary battery, comprising: an electrode plate placing step of placing a predetermined number of positive electrode plates on a positive electrode plate cassette member; an electrode plate supply step of batchwise supplying the predetermined number of positive electrode plates placed on the positive electrode plate cassette member to an electrode plate conveying member for positive electrode plates; a zigzag folding step of pushing a superposed body, which has a negative electrode plate sandwiched between two separators, by a plurality of guide members to fold the superposed body zigzag; a multilayer body formation step of inserting the positive electrode plates placed on the electrode plate conveying member for positive electrode plates into respective furrows of the zigzag-folded superposed body to form a multilayer body having the positive electrode plates and the negative electrode plate superposed alternately via the separators; a withdrawal step of withdrawing the guide members from inside the respective furrows of the superposed body; and a pressing step of pressing the multilayer body in a direction in which the positive electrode plates and the negative electrode plate are stacked.

A third aspect of the present invention lies in the method for producing a secondary battery according to the first or second aspect, further comprising a separator arrangement step of arranging the plurality of guide members zigzag in a vertical direction, and disposing the separator or the superposed body between one row and another row of the guide members, wherein the zigzag folding step is performed by crossing the guide members in a horizontal direction between the rows.

A fourth aspect of the present invention lies in the method for producing a secondary battery according to any one of the first to third aspects, wherein the electrode plate supply step is performed prior to the zigzag folding step.

A fifth aspect of the present invention lies in the method for producing a secondary battery according to any one of the first to fourth aspects, wherein the electrode plate placing step is performed not later than the pressing step performed for producing an immediately preceding secondary battery.

A sixth aspect of the present invention lies in the method for producing a secondary battery according to any one of the first to fifth aspects, wherein the electrode plate placing step involves placing the positive electrode plates or the negative electrode plates on the positive electrode plate or negative electrode plate cassette member which is different from the positive electrode plate or negative electrode plate cassette member used in the electrode plate placing step performed for producing an immediately preceding secondary battery.

A seventh aspect of the present invention lies in an apparatus for producing a secondary battery, comprising: zigzag folding means which has a plurality of guide members arranged zigzag in a vertical direction and which, when a separator is disposed between one row and another row of the guide members, crosses the guide members in a horizontal direction between the rows to fold the separator zigzag; electrode plate insertion means which has an electrode plate conveying member for positive electrode plates or negative electrode plates for placing thereon a predetermined number of the positive electrode plates or the negative electrode plates, and which moves the electrode plate conveying member for positive electrode plates or negative electrode plates into respective furrows of the separator to insert the positive electrode plates and the negative electrode plates into the respective furrows; and pressing means for pressing a multilayer body, composed of the positive electrode plates and the negative electrode plates superposed alternately via the separator, in a direction in which the electrode plates are stacked, and further comprising supply means which has a positive electrode plate or negative electrode plate cassette member for placing thereon a predetermined number of the positive electrode plates or the negative electrode plates, and which batchwise supplies a plurality of the positive electrode plates or the negative electrode plates placed on the positive electrode plate or negative electrode plate cassette member to the electrode plate conveying member for positive electrode plates or negative electrode plates.

An eighth aspect of the present invention lies in an apparatus for producing a secondary battery, comprising: zigzag folding means which has a plurality of guide members arranged zigzag in a vertical direction and which, when a superposed body having a negative electrode plate sandwiched between two separators is disposed between one row and another row of the guide members, crosses the guide members in a horizontal direction between the rows to fold the superposed body zigzag; electrode plate insertion means which has an electrode plate conveying member for positive electrode plates for placing thereon a predetermined number of the positive electrode plates, and which moves the electrode plate conveying member for positive electrode plates into respective furrows of the superposed body to insert the positive electrode plates into the respective furrows; and pressing means for pressing a multilayer body, composed of the positive electrode plates and the negative electrode plate superposed alternately via the separators, in a direction in which the electrode plates are stacked, and further comprising supply means which has a positive electrode plate cassette member for placing thereon a predetermined number of the positive electrode plates, and which batchwise supplies the predetermined number of the positive electrode plates, placed on the positive electrode plate cassette member, to the electrode plate conveying member for positive electrode plates.

A ninth aspect of the present invention lies in the apparatus for producing a secondary battery according to the seventh or eighth aspect, wherein the supply means batchwise supplies the predetermined number of the positive electrode plates or the negative electrode plates from the positive electrode plate or negative electrode plate cassette member to the electrode plate conveying member for positive electrode plates or negative electrode plates not later than the zigzag folding of the separator or the superposed body by the zigzag folding means.

A tenth aspect of the present invention lies in the apparatus for producing a secondary battery according to any one of the seventh to ninth aspects, wherein the supply means has a plurality of the positive electrode plate or negative electrode plate cassette members.

An eleventh aspect of the present invention lies in the apparatus for producing a secondary battery according to any one of the seventh to tenth aspects, wherein the supply means has a pressing member for pressing edges of the positive electrode plates or the negative electrode plates placed on the positive electrode plate or negative electrode plate cassette member.

A twelfth aspect of the present invention lies in the apparatus for producing a secondary battery according to the eleventh aspect, wherein the pressing member presses the edge parts of the positive electrode plates or the negative electrode plates on a side opposite to lead parts thereof.

Effects of the Invention

According to the present invention, the electrode plates can be supplied to the electrode plate conveying member in an extremely short time, and tact time can be shortened markedly.

Moreover, the electrode plates can be placed on each electrode plate conveying member while being positioned with high accuracy. As a result, the positional accuracy of the electrode plate inserted into each furrow of the separator can be increased and, eventually, the quality of the electrode plate group can be improved.

MODE FOR CARRYING OUT THE INVENTION

Modes for carrying out the present invention will be described by reference to the accompanying drawings.

Embodiment 1

Figure 1:
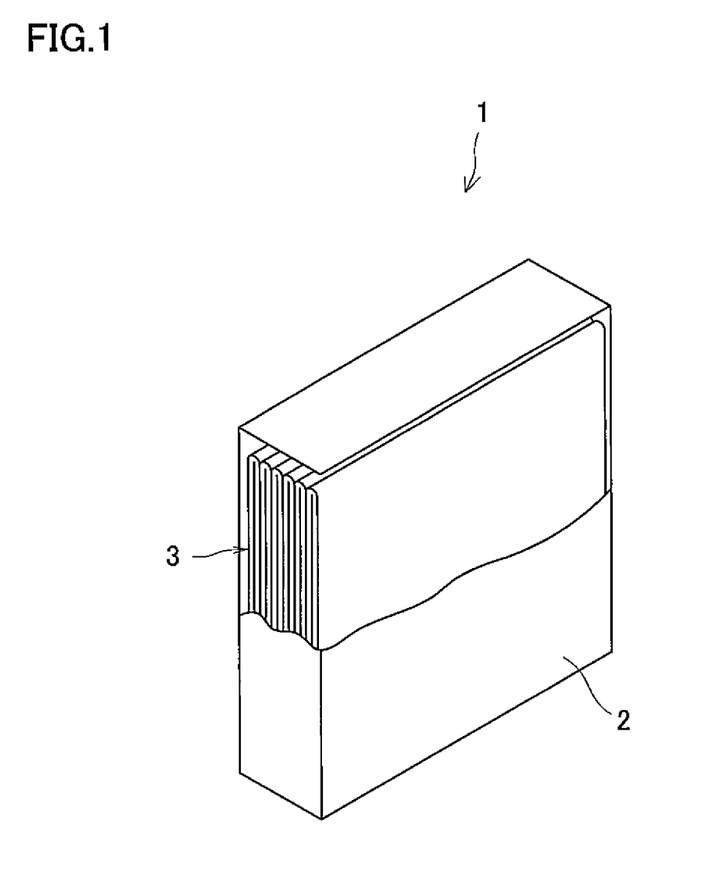
FIG. 1 is a perspective view showing the outline of a square battery accommodating an electrode plate group according to Embodiment 1.
Figure 2:
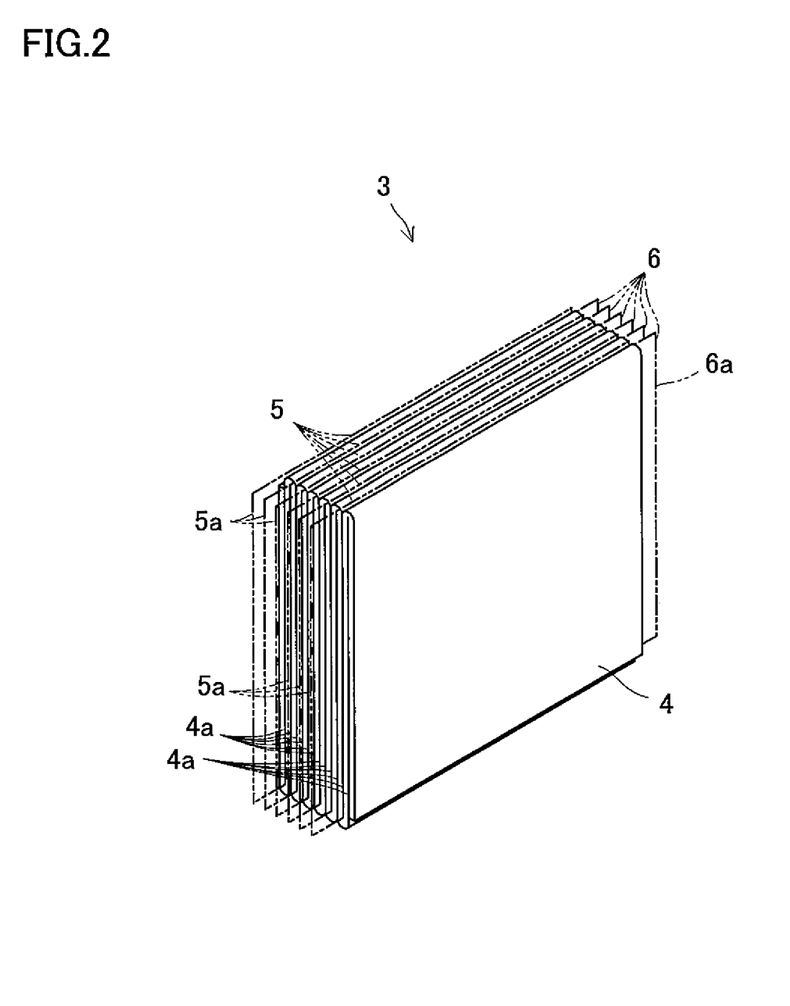
FIG. 2 is a perspective view showing the schematic configuration of the electrode plate group according to Embodiment 1.

As shown in FIGS. 1 and 2, a square battery (secondary battery) 1, which is a lithium ion secondary battery, has a square case 2, and an electrode plate group 3 is housed inside the square case 2. A positive electrode terminal and a negative electrode terminal (not shown) are provided at predetermined locations of the square case 2. The interior of the square case 2 is filled with an electrolyte comprising a lithium salt blended with an organic solvent.

The electrode plate group 3 includes a zigzag-folded separator 4, and positive electrode plates 5 and negative electrode plates 6 inserted alternately into the respective furrows 4a of the separator 4. The positive electrode plates and the negative electrode plates 6 are alternately superposed such that the separator 4 is interposed between the adjacent positive electrode plate 5 and negative electrode plate 6, and the separator 4 is in a flat-folded state. The positive electrode plates 5 and the negative electrode plates 6 have lead parts 5a, 6a protruding from the separator 4 to sides opposite to each other, and the lead parts 5a, 6a of the respective electrodes are bundled, respectively. The lead parts 5a of the positive electrode plates 5 are connected to the positive electrode terminal, while the lead parts 6a of the negative electrode plates 6 are connected to the negative electrode terminal.

A production apparatus 10 for producing the electrode plate group 3 of the above-mentioned configuration is equipped with at least a zigzag folding means, an electrode plate insertion means, a supply means, and a pressing means, as will be explained below.

As shown in FIG. 3(a), the zigzag folding means has a plurality of guide bars (guide members) 11 arranged zigzag in a vertical direction. When the separator 4 is disposed between one row 12A and another row 12B of the guide bars 11, the guide bars 11 are allowed to cross in a horizontal direction between the rows 12A and 12B to fold the separator 4 zigzag, as shown in FIG. 3(b).

There are provided the guide bars 11 whose number is the same as, or larger than, the number of the positive and negative electrode plates 5, 6 supplied to the separator 4. The plurality of guide bars 11 are arranged, each in a horizontal posture, in the two rows 12A, 12B vertically on a platform (not shown). Also, the guide bars 11 are arranged zigzag between the rows 12A and 12B, namely, zigzag in the vertical direction. These guide bars 11 are supported in a cantilever manner by vertical frames 13, 14 provided for the rows 12A, 12B, respectively.

The zigzag folding means also has a drive unit which, when the separator 4 is disposed between the one row 12A and the other row 12B of the guide bars 11, crosses the guide bars 11 between the rows 12A and 12B to fold the separator 4 zigzag. This drive unit is constituted, for example, by a ball screw, a motor for rotating the ball screw, and so on. Since the drive unit thus composed of the ball screw, motor, etc. is an ordinary feeding means, its illustration is omitted.

On the platform (not shown) of the production apparatus 10, moreover, a platen 15 for stopping and supporting the zigzag-folded separator 4 from below is installed movably. In the vicinity of the platen 15, a clamp 16 for gripping the starting end of the separator 4 is provided movably so as not to interfere with the platen 15. Above the platen 15, a roll 17 of the separator 4 wound up is provided. The roll 17 is held rotatably so as to minimize load on the separator 4 in its paid-out direction. Thus, tension generated at the locations of the zigzag folding of the separator 4 is reduced. Along the traveling path of the separator 4, a cutter 18 is provided for cutting the separator 4, which has been paid out from the roll 17, at a predetermined site.

The electrode plate insertion means is equipped with an electrode plate conveying member 20 having a plurality of electrode plate conveying trays 19 on which a predetermined number of the positive electrode plates 5 or the negative electrode plates 6 are placed. Each electrode plate conveying tray 19 of the electrode plate conveying member 20 is moved into each furrow 4a (see FIG. 2) of the separator 4, whereby the positive electrode plates 5 and the negative electrode plates 6 are alternately inserted into the respective furrows 4a. In the present embodiment, the electrode plate insertion means is provided with a first electrode plate conveying member (electrode plate conveying member for positive electrode plates) 20A for conveying the positive electrode plates 5, and a second electrode plate conveying member (electrode plate conveying member for negative electrode plates) 20B for conveying the negative electrode plates 6. The first electrode plate conveying member 20A has the same number of the electrode plate conveying trays 19 as the number of the positive electrode plates 5 necessary for the electrode plate group 3. The respective electrode plate conveying trays 19 of the first electrode plate conveying member 20A are arranged horizontally behind the guide bars 11 constituting the one row 12A, and have rear ends connected by a support frame 21A. Similarly, the second electrode plate conveying member 20B also has a plurality of the electrode plate conveying trays 19. The electrode plate conveying trays 19 of the second electrode plate conveying member 20B are arranged horizontally behind the guide bars 11 constituting the other row 12B, and have rear ends connected by a support frame 21B.

The support frames 21A, 21B are connected, respectively, to piston rods 22a of piston cylinder devices 22 capable of expansion and contraction in the conveying direction of the positive electrode plates 5 or the negative electrode plates 6. Each piston cylinder device 22 is installed on a reciprocating table 23 which can reciprocate in the conveying direction of the positive electrode plate 5 or the negative electrode plate 6.

Each reciprocating table 23 is adapted to be movable in the horizontal direction by a drive unit composed of a ball screw, etc. Concretely, each reciprocating table 23 is connected to a nut 25 screwed to a ball screw 24 which is a feed screw installed rotatably on the platform. The ball screw 24 is adapted to be rotated by a motor (not shown). When the ball screw 24 is rotated, the first and second electrode plate conveying members 20A, 20B are each moved to supply batchwise the respective electrode plate conveying trays 19 into the respective furrows 4a of the separator 4.

Paired push members 26 to be brought into contact with edge parts of the separator 4 are provided on the right and left sides of the electrode plate conveying tray 19 (on both sides in a direction perpendicular to the moving direction of the electrode plate conveying tray 19). Concretely, the push members 26 are constituted as paired vertical bars to be contacted with the edge parts of the positive electrode plate 5 and the negative electrode plate 6 protruding from the right and left sides of each electrode plate conveying tray 19, and are attached to each reciprocating table 23. Thus, when the reciprocating table 23 moves upon rotation of the ball screw 24, the push members 26 also reciprocate together with the electrode plate conveying member 20. When, after advancement of each electrode plate conveying tray 19 into the furrow 4a of the separator 4, each piston cylinder device 22 acts to contract, each electrode plate conveying tray 19 is retreated out of the furrow 4a, but the push members 26 remain at the advanced position. As a result, the positive electrode plate 5 and the negative electrode plate 6 are restrained from movement by the push members 26, and remain in the furrows 4a of the separator 4.

As detailed above, the positive electrode plates 5 and the negative electrode plates 6 are inserted in a lump into the furrows 4a of the separator 4 by the electrode plate conveying member 20. By so doing, tact time can be shortened.

The electrode plate conveying member 20 may be moved after zigzag folding of the separator 4 by the guide bars 11, but should desirably be moved at the same time that the guide bars 11 are crossed between the rows 12A and 12B, and the separator 4 is zigzag-folded thereby. By this procedure, it becomes possible to insert the positive electrode plates 5 and the negative electrode plates 6 into the respective furrows 4a of the separator 4, while folding the separator 4 zigzag. Thus, tact time is rendered even shorter.

Figure 4:
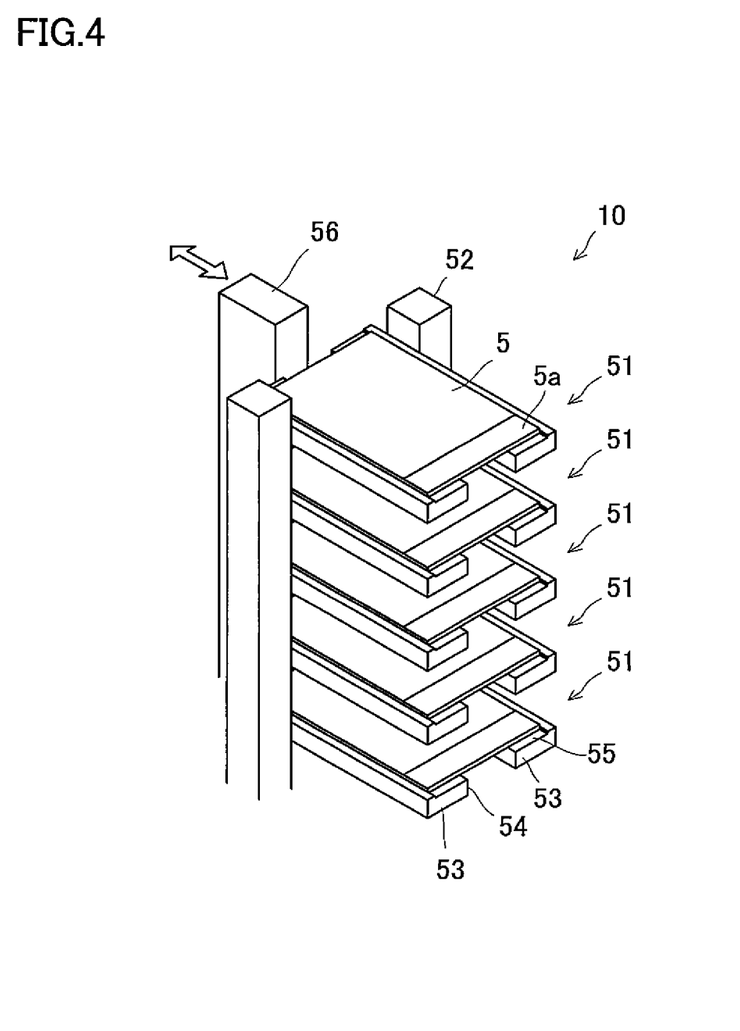
FIG. 4 is a schematic perspective view showing the configuration of supply means according to Embodiment 1.
Figure 5:
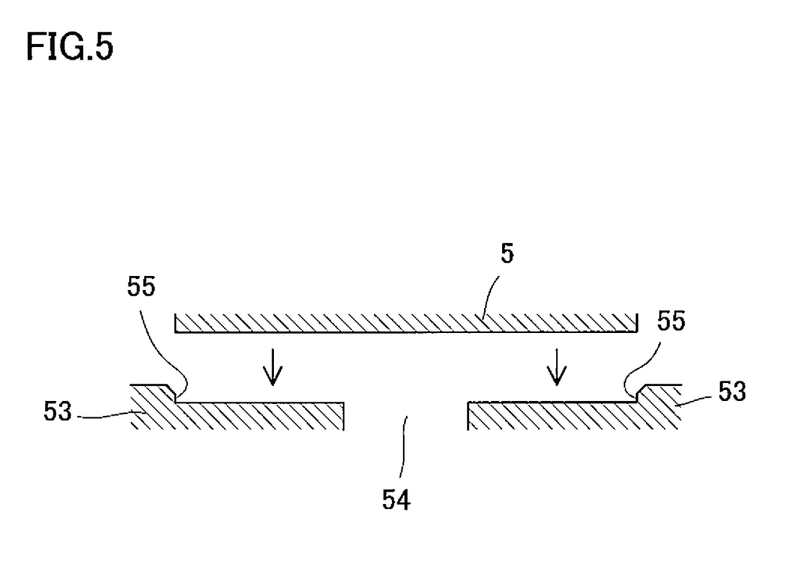
FIG. 5 is a sectional view showing the outline of a cassette member according to Embodiment 1.

As shown in FIG. 4, the supply means has, for example, a cassette member (a positive electrode plate or negative electrode plate cassette member) 50 on which a predetermined number of the positive electrode plates 5 or the negative electrode plates 6 are placed. The supply means batchwise supplies the predetermined number of the positive electrode plates 5 or the negative electrode plates 6 placed on the cassette member 50 to the respective electrode plate conveying trays 19 of the electrode plate conveying member 20. FIGS. 4 and 5 exemplify the cassette member (positive electrode plate cassette member) 50 on which the positive electrode plates 5 are loaded.

Figure 3:
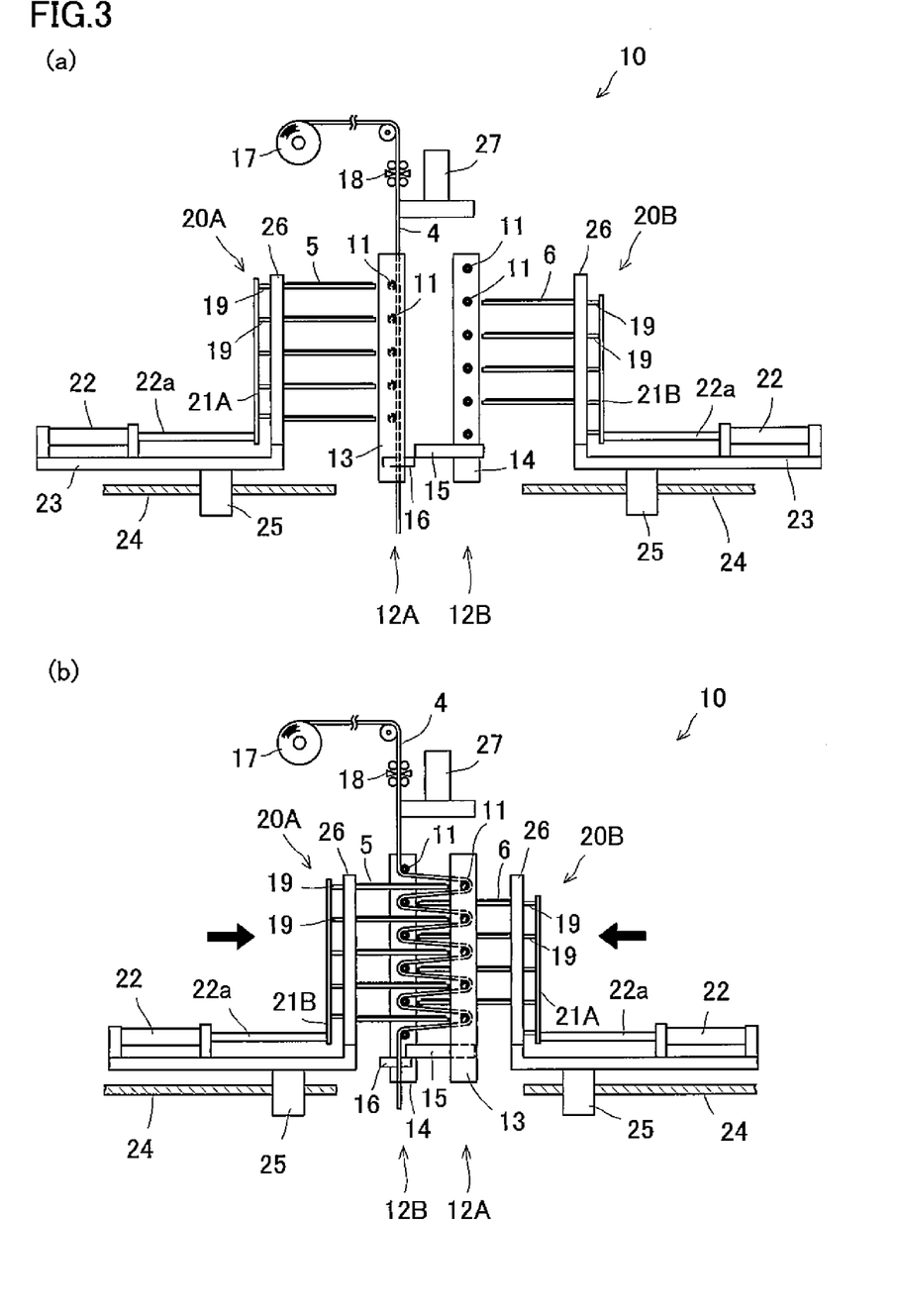
FIGS. 3(a), 3(b) are schematic views showing an apparatus for producing the electrode plate group according to Embodiment 1.

The cassette member 50 is provided in correspondence with each of the first electrode plate conveying member 20A and the second electrode plate conveying member 20B (see FIGS. 3(*a*), 3(*b*)). Each cassette member 50 has a plurality of electrode plate holding sections 51 for holding the positive electrode plates 5 or the negative electrode plates 6. The electrode plate holding sections 51 are provided in a plurality of stages in correspondence with the respective electrode plate conveying trays 19 of the electrode plate conveying member 20. Each electrode plate holding section 51 is composed of a pair of support plates 53 fixed to struts 52, and a slit portion 54 of a predetermined width is provided between the support plates 53. In the support plate 53, as shown in FIG. 5, a guide groove 55 into which the positive electrode plate 5 or the negative electrode plate 6 is inserted is formed along the slit portion 54.

Moreover, the supply means is equipped with a pressing member 56 for pressing edge parts of the positive electrode plates 5 or the negative electrode plates 6, which have been placed on the cassette member 50, toward the electrode plate conveying member 20. The pressing member 56 is constituted as a vertical bar to be brought into contact with the edge parts of the positive electrode plates 5 or the negative electrode plates 6, and is provided to be movable within the slit portion 54 between the pair of support plates 53. That is, the pressing member 56 is formed with a slightly smaller width than the slit portion 54, and is adapted to be rectilinearly movable by a drive means such as a piston cylinder device (not shown). The cassette member 50 and the pressing member 56 are loaded on a moving table (not shown) and, as will be described later, are adapted to be movable between an electrode plate loading unit, where the positive electrode plates 5 and the negative electrode plates 6 are loaded onto the cassette member 50 by a robot arm or the like, and the electrode plate conveying member 20.

According to the present invention, the predetermined number of positive electrode plates 5 or negative electrode plates 6 are supplied batchwise to the respective electrode plate conveying trays 19 of the electrode plate conveying member 20 by the supply means of the above-described configuration. By this measure, it is attempted to shorten the tact time further and improve the quality of the electrode plate group 3.

The press means is constituted as a pusher 27 ascendable and descendable in the vertical direction above the platform, and presses the separator 4 in the stacking direction of the positive and negative electrode plates 5, 6 to flatten it. The pusher 27 presses the separator 4 in the stacking direction of these electrode plates 5, 6, with the movement of the positive electrode plates 5 and the negative electrode plates 6 being restrained by the push members 26. As a result, the separator 4 is pressed into a flat form, with the positive electrode plates 5 and the negative electrode plates 6 being sandwiched between its folds, whereby the flat electrode plate group 3 of a predetermined thickness is formed.

A method for producing the electrode plate group 3 by the production apparatus 10 of the above-mentioned configuration will be described below by reference to FIGS. 6(*a*), 6(*b*) to FIG. 10.

Figure 6:
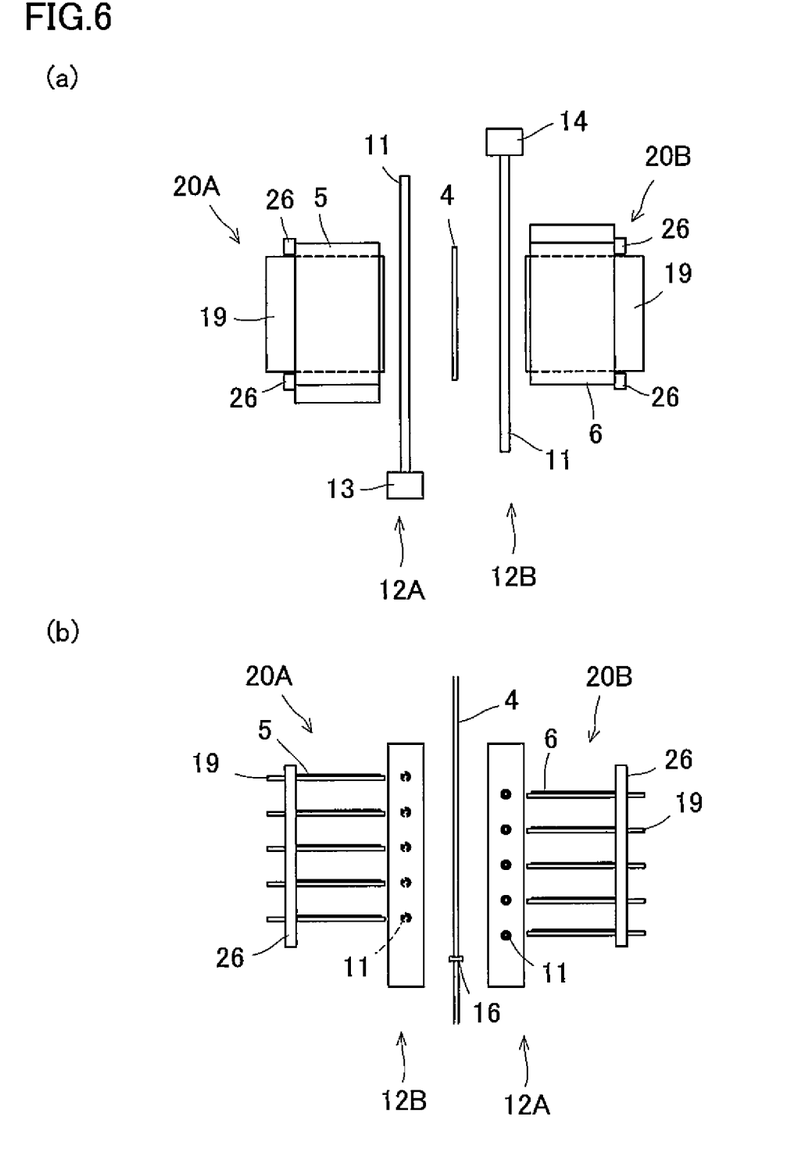
FIGS. 6(a), 6(b) are schematic views showing a method for producing the electrode plate group using the production apparatus according to Embodiment 1.

First of all, as shown in FIGS. 6(*a*), 6(*b*), the separator 4 is disposed between the one row 12A and the other row 12B of the guide bars 11 arranged zigzag, and the leading end of the separator 4 is gripped by the clamp 16. The separator 4 is paid out from the roll 17 (see FIGS. 3(*a*), 3(*b*)), and stretched between the rows 12A and 12B of the guide bars 11 in the vertical direction under relatively low tension.

Figure 7:
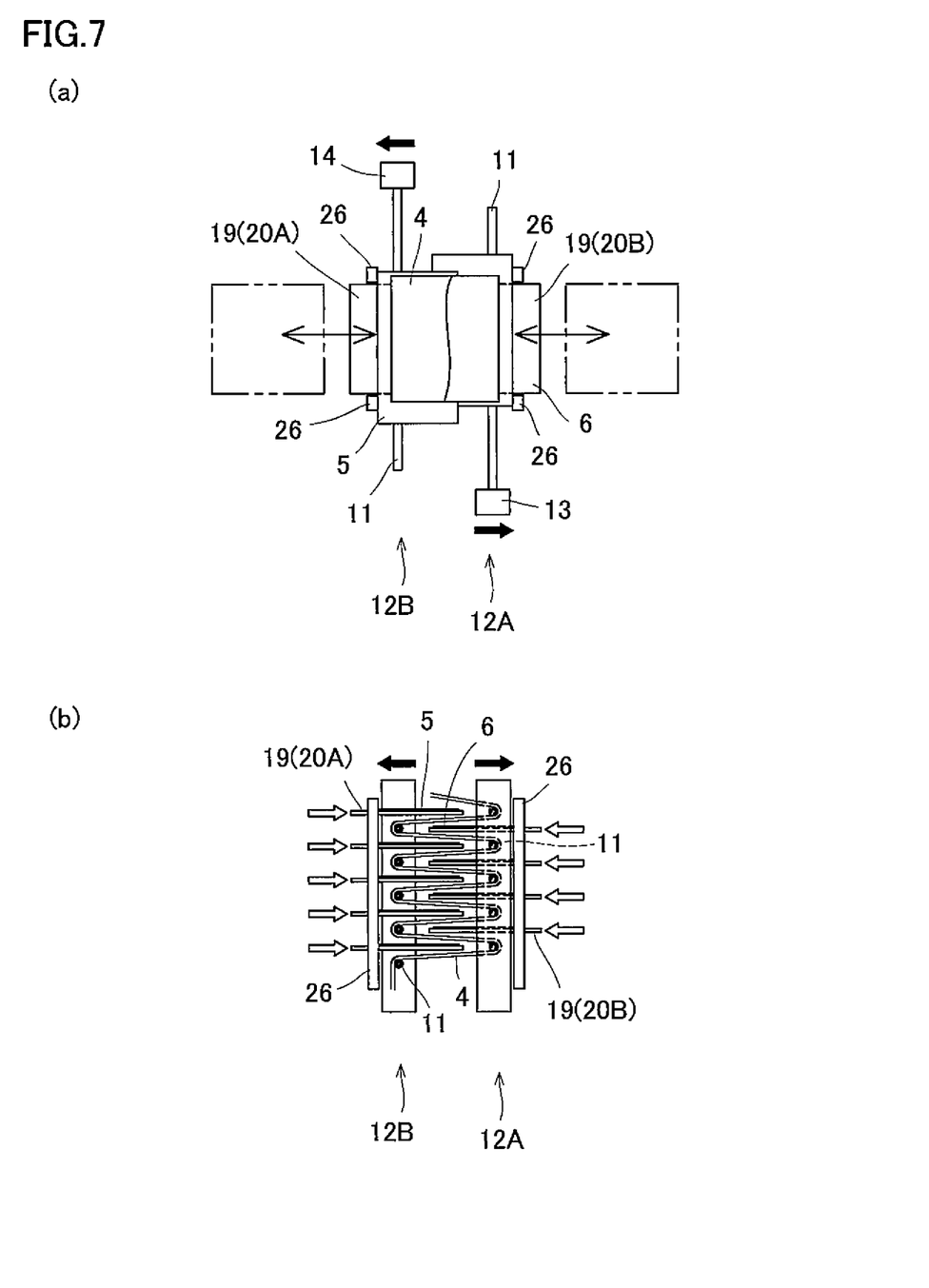
FIGS. 7(a), 7(b) are schematic views showing the method for producing the electrode plate group using the production apparatus according to Embodiment 1.

In this state, the rows 12A and 12B of the guide bars 11 are horizontally moved toward the separator 4, and the guide bars 11 are crossed between the rows. By this measure, as shown in FIGS. 7(*a*), 7(*b*), the separator 4 is folded zigzag, and the required number of the furrows 4a for one electrode plate group 3 are simultaneously formed in the separator 4. That is, the separator 4 is zigzag-folded by pushing the separator 4 using the guide bars 11 (zigzag folding step).

According to the present embodiment, moreover, the guide bars 11 in each of the rows 12A and 12B are moved in the horizontal direction and, at the same time, the first and second electrode plate conveying members 20A, 20B and the push member 26 are also moved horizontally toward the separator 4. As a result, the positive electrode plates 5 loaded beforehand on the respective electrode plate conveying trays 19 of the first electrode plate conveying member 20A and the negative electrode plates 6 loaded beforehand on the respective electrode plate conveying trays 19 of the second electrode plate conveying member 20B are inserted alternately into the respective furrows 4a of the separator 4 folded zigzag (multilayer body formation step).

Then, the guide bars 11 are withdrawn from the interior of each furrow 4a of the separator 4 (withdrawal step). Then, the first and second electrode plate conveying members 20A, 20B are moved away from the separator 4, with the push members 26 being left behind. Simultaneously, the pusher 27 is lowered, whereby the resulting multilayer body having the positive electrode plates 5 and the negative electrode plates 6 stacked alternately via the separator 4 is vigorously pressed toward the platen 15 in the stacking direction of the positive electrode plates 5 and the negative electrode plates 6 (pressing step). That is, with the multilayer body being pressed in the stacking direction of the positive electrode plates 5 and the negative electrode plates 6, the first and second electrode plate conveying members 20A, 20B are returned to the original positions (indicated by dashed double-dotted lines in FIG. 7(*a*)). Consequently, there is formed a flat multilayer body having the positive electrode plates 5 and the negative electrode plates 6 stacked alternately via the separator 4.

In withdrawing the guide bars 11 from inside the furrows 4*a* of the separator 4, the separator 4 may be lightly pressed with the pusher 27. By so doing, a loss in the zigzag-folded shape of the separator 4, which may be caused during withdrawal of the guide bars 11, can be suppressed. After the step of withdrawing the guide bars 11 from inside each furrow 4*a* of the separator 4, the step of pressing the multilayer body and the step of returning the first and second electrode plate conveying members 20A, 20B to their original positions are performed as stated above. However, after the step of returning the first and second electrode plate conveying members 20A, 20B to the original positions, the step of withdrawing the guide bars 11 from inside each furrow 4*a* of the separator 4 may be carried out.

After formation of the flat multilayer body, the leading end of the separator 4 is released from the clamp 16, and the rear end of the separator 4 is cut by the cutter 18, whereby the electrode plate group 3 is formed. Further, this electrode plate group 3 is accommodated in the case 2 for the battery to form the square battery 1.

The respective electrode plate conveying trays 19 of the first and second electrode plate conveying members 20A, 20B are supplied batchwise with the positive electrode plates 5 or the negative electrode plates 6 loaded on the support plates 53 of the cassette member 50 by pushing these positive electrode plates 5 or negative electrode plates 6 using the pressing member 56 (electrode plate supply step).

The support plates 53 constituting the electrode plate holding sections 51 of the cassette member 50 are loaded with the positive electrode plates 5 or the negative electrode plates 6 in the electrode plate loading unit (not shown) provided at a position spaced from the electrode plate conveying member 20. At the start of production of the electrode plate group 3, the cassette member 50 is in a state where the predetermined number of the positive electrode plates 5 or negative electrode plates 6 are beforehand placed thereon. A method for loading the positive electrode plates 5 or negative electrode plates 6 onto the cassette member 50 in the electrode plate loading unit is not limited. For example, the positive electrode plates 5 or negative electrode plates 6 stored in the electrode plate loading unit may be held by suction using a robot arm or the like, and placed on the support plates 53 of the cassette member 50.

Figure 8:
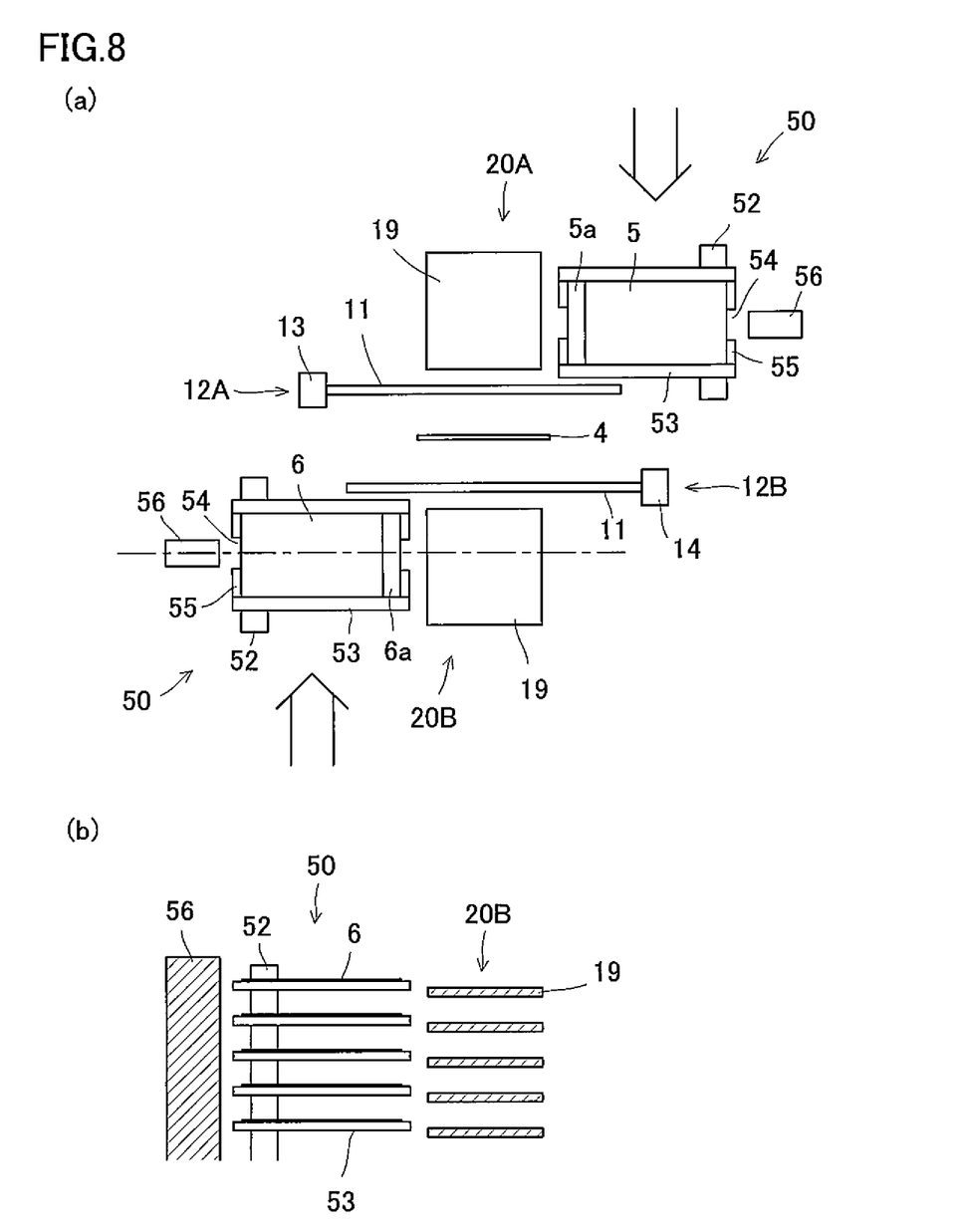
FIGS. 8(a), 8(b) are schematic views showing the method for producing the electrode plate group using the production apparatus according to Embodiment 1.
Figure 9:
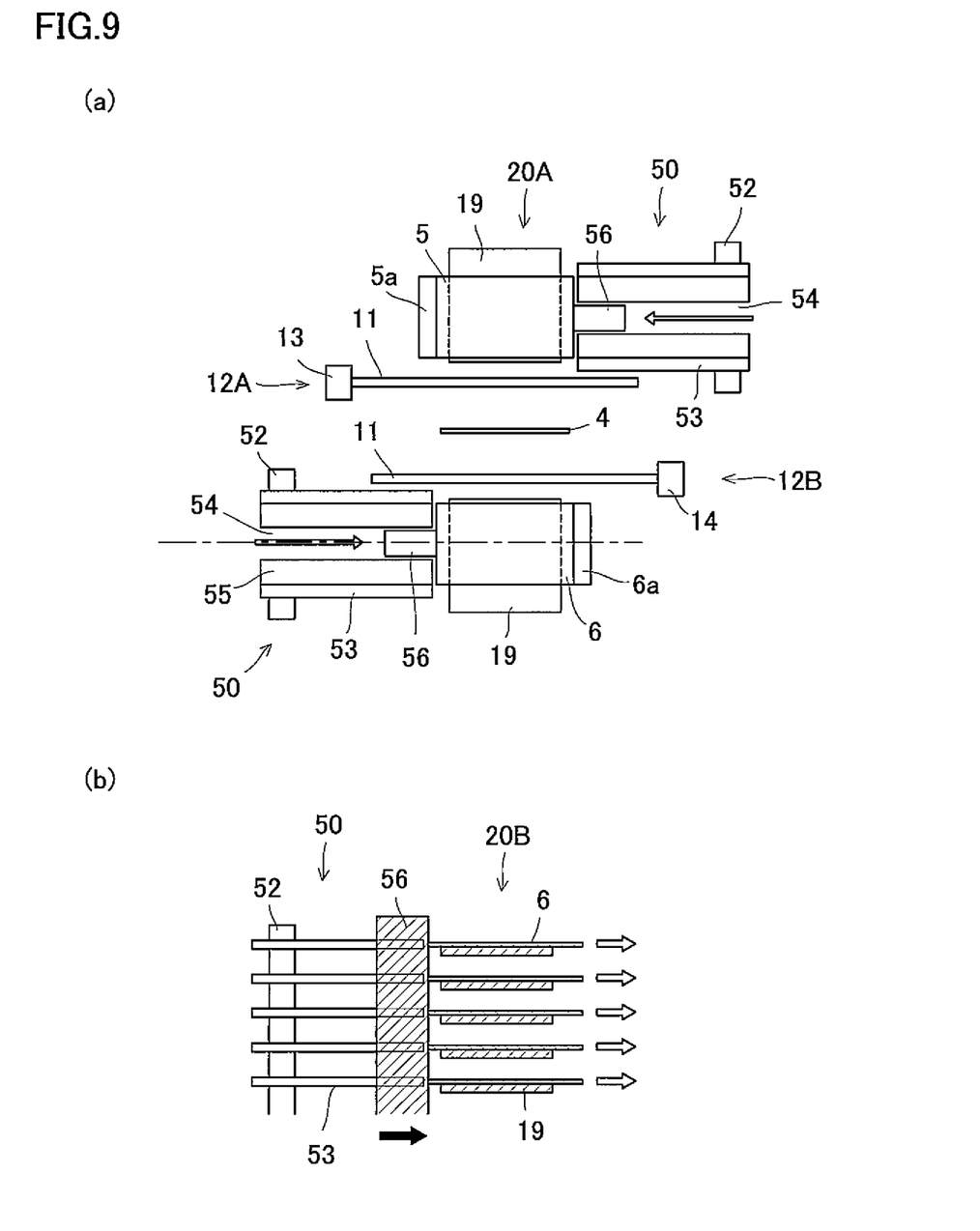
FIGS. 9(a), 9(b) are schematic views showing the method for producing the electrode plate group using the production apparatus according to Embodiment 1.

When the production method for the electrode plate group 3 is started, the cassette members 50 bearing the positive electrode plates 5 or the negative electrode plates 6 are each moved to a position close to each electrode plate conveying member 20, as shown in FIGS. 8(*a*), 8(*b*). In this state, the rod-shaped pressing member 56 is slid toward the slit portion 54, as shown in FIGS. 9(*a*), 9(*b*). By so doing, the predetermined number of the positive electrode plates 5 or the negative electrode plates 6 placed on each cassette member 50 are pushed out by the pressing member 56, and supplied batchwise to the electrode plate conveying trays 19 of the first or second electrode plate conveying member 20A or 20B.

In the manner described above, the positive electrode plates 5 or the negative electrode plates 6 can be supplied to the electrode plate conveying trays 19 in a very short time, and tact time can be shortened markedly. In the present embodiment, moreover, a plurality of the positive electrode plates 5 or the negative electrode plates 6 loaded on the cassette member 50 are supplied batchwise to the electrode plate conveying trays 19 of the electrode plate conveying member 20 by being pressed by means of the rod-shaped pressing member 56. Thus, each positive electrode plate 5 or negative electrode plate 6 can be placed on each electrode plate conveying tray 19 in a highly accurately positioned state. Hence, the positional accuracy of the positive electrode plate 6 and the negative electrode plate 6 inserted into each furrow 4*a* of the separator 4 can be increased, and eventually the quality of the electrode plate group 3 can be upgraded.

In supplying the positive electrode plates 5 and the negative electrode plates 6 to the electrode plate conveying trays 19, it is preferred to press edge parts different from the lead parts 5*a*, 6*a*, especially edge parts on the side opposite to the side where the lead parts 5*a*, 6*a* are located, of the positive electrode plate 5 and the negative electrode plate 6 by the pressing member 56. By this measure, the positive electrode plates 5 and the negative electrode plates 6 can be supplied satisfactorily to the electrode plate conveying trays 19, with deformation of the positive electrode plates 5 and the negative electrode plates 6 due to pressing by the pressing member 56 being suppressed.

Each cassette member 50, which has supplied the positive electrode plates 5 or the negative electrode plates 6 to the electrode plate conveying member 20, is moved again to the electrode plate loading unit, where the positive electrode plates 5 or the negative electrode plates 6 for use in an electrode plate group 3 to be produced next are placed on the cassette member 50. When the succeeding production of the electrode plate group 3 is started, therefore, the cassette member 50 is preloaded with a predetermined number of the positive electrode plates 5 or the negative electrode plates 6. That is, not later than the pressing step of pressing the multilayer body having the positive electrode plates 5 and the negative electrode plates 6 superposed alternately to be described later, i.e., the step to be performed for production of an immediately preceding electrode plate group 3, the electrode plate placing step of placing the positive electrode plates 5 or the negative electrode plates 6 on the cassette member 50 is completed as a step for producing a following electrode plate group 3. In a case where an electrode plate group 3 is to have a large number of the electrode plates 5,6, for example, it is conceivable that the placement of the positive and negative electrode plates 5,6 on the cassette members 50 will not be in time for the start of production of a next electrode plate group 3. In such a case, it is preferred to provide a plurality of the cassette members 50 for each electrode plate conveying member 20. That is, it is preferred to provide a plurality of the cassette members 50 for both of the positive electrode plates and the negative electrode plates, and place the positive electrode plates 5 or the negative electrode plates 6 on the cassette member 50 which is different from the cassette member 50 used in the process for producing the immediately preceding electrode plate group 3. Because of this procedure, by the time the production of a next electrode plate group 3 is started, a predetermined number of the positive electrode plates 5 or the negative electrode plates 6 can be placed on the cassette member 50, so that tact time can be shortened more reliably.

Embodiment 2

Figure 10:
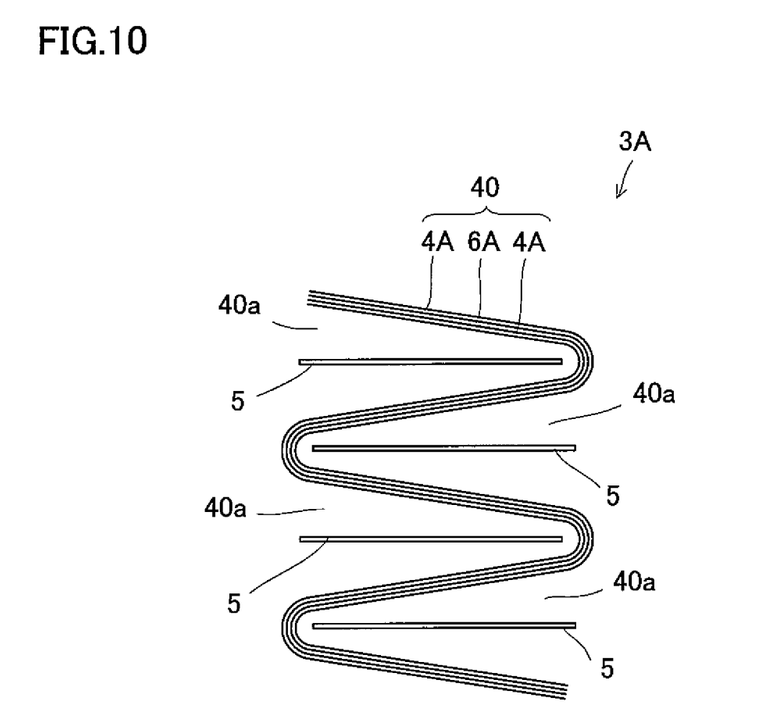
FIG. 10 is a schematic view showing an electrode plate group according to Embodiment 2.
Figure 11:
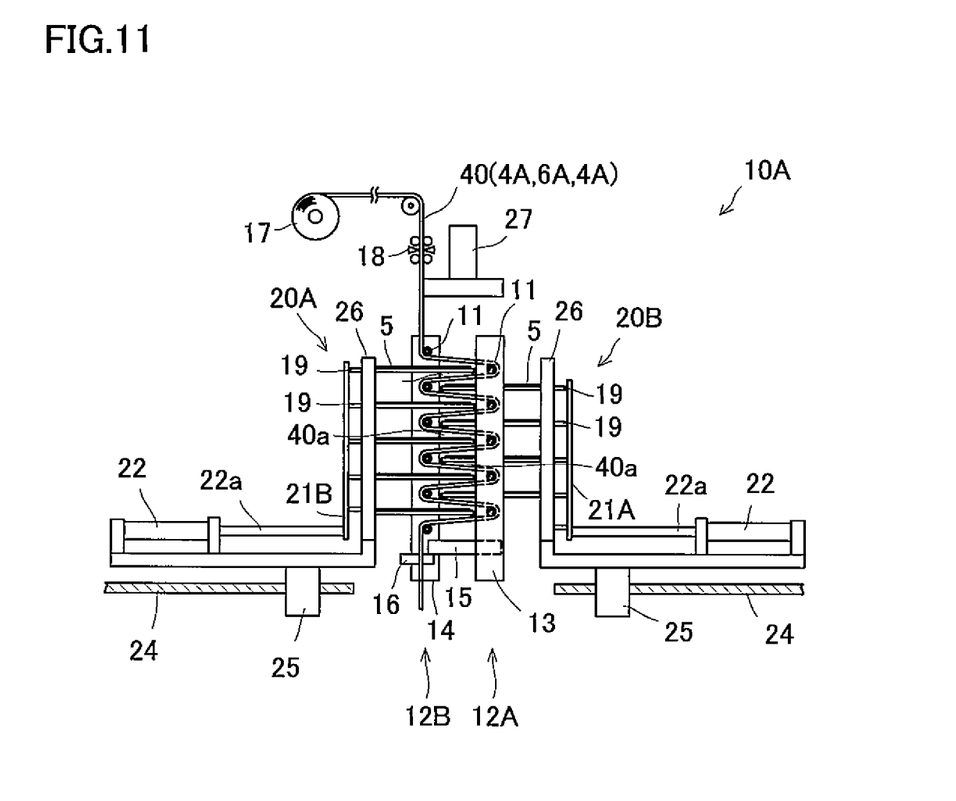
FIG. 11 is a schematic view showing an apparatus for producing the electrode plate group according to Embodiment 2.

FIG. 10 is a perspective view showing the schematic configuration of an electrode plate group according to Embodiment 2. FIG. 11 is a schematic view showing a production apparatus according to Embodiment 2. The same members as those shown above are assigned the same numerals as their numerals, and duplicate explanations will be omitted.

As shown in FIG. 10, an electrode plate group 3A according to Embodiment 2 is constituted as a flat multilayer body including a zigzag-folded continuous superposed body 40, and positive electrode plates 5 inserted into furrows 40a of the superposed body 40. The superposed body 40 is a laminate comprising a negative electrode plate 6A sandwiched between two separators 4A. Thus, the positive electrode plate 5 inserted into each furrow 40a of the superposed body 40 faces the negative electrode plate 6A via the separator 4A.

In the above-mentioned configuration of the present embodiment as well, the positive electrode plates 5 and the negative electrode plate 6A are provided with lead parts 5a and 6a protruding from the separators 4A in directions opposite to each other (see FIG. 2), as in Embodiment 1. The lead parts 5a, 6a of the respective electrodes are bundled, and connected, respectively, to a positive electrode terminal and a negative electrode terminal (not shown) of a square case 2 (see FIG. 1).

As shown in FIG. 11, a production apparatus 10A for producing the above electrode plate group 3A is in a configuration having a plurality of guide bars 11 arranged zigzag and having other components, as in Embodiment 1, except that the superposed body 40 is inserted between one row 12A and another row 12B of the guide bars 11. Moreover, each of first and second electrode plate conveying members 20A, 20B is adapted to convey the positive electrode plates 5 into the furrows 40a of the superposed body 40. Except for these features, the production apparatus 10A according to Embodiment 2 is of the same configuration as that of the production apparatus 10 according to Embodiment 1.

With the production apparatus 10A according to Embodiment 2 described above, it suffices to form in the superposed body 40 the furrows 40a into which only the positive electrode plates 5 are inserted. Thus, in producing the electrode plate group 3A of the same performance as that of the electrode plate group 3 of Embodiment 1, it is sufficient for the number of the furrows 40a of the superposed body 40 to be a half of the number in Embodiment 1. Thus, the number of the guide bars 11 and the electrode plate conveying trays 19 can be decreased to nearly a half and, by extension, tact time can be shortened further.

Other Embodiments

The present invention has been described above in regard to its embodiments, but it is to be noted that the present invention is in way limited to these embodiments. The present invention can be changed and modified, as appropriate, without departing from its gist.

In the above embodiments, for example, an example in which the positive or negative electrode plates loaded on the cassette member are pushed by the pressing member is explained as the method for supplying the positive or negative electrode plates from the cassette member to the electrode plate conveying trays. However, the method for supply is not limited to the above method, because any method capable of supplying the electrode plates batchwise to the electrode plate conveying trays can be adopted. For example, it is permissible to grasp the positive or negative electrode plates on the cassette member from the electrode plate conveying tray side, and pull out the electrode plates from the cassette member onto the electrode plate conveying trays.

In the above embodiments, moreover, the lithium ion secondary battery is exemplified as an example of the square battery. However, the present invention is also applicable to batteries other than the lithium ion secondary battery, and to primary batteries, etc. Furthermore, in the above embodiments, when the guide bars are crossed between the rows, both rows are moved. However, the same zigzag folding can be achieved, even if the guide bars in the one row remain stopped, and the guide bars in the other row are moved. If such features are adopted, the number of the drive units for moving the row of the guide bars can be decreased, and the costs can be reduced. Besides, the numbers of the guide bars and the electrode plate conveying trays can be increased or decreased, and are not limited to them specified in the above embodiments.

EXPLANATIONS OF LETTERS OR NUMERALS

1 Square battery
2 Square case
3 Electrode plate group
4 Separator
4a Furrow
5 Positive electrode plate
6 Negative electrode plate
5a, 6a Lead part
10 Production apparatus
11 Guide bar
12 Row
13, 14 Vertical frame
15 Platen
16 Clamp
17 Roll
18 Cutter
19 Electrode plate conveying tray
20 Electrode plate conveying member
21 Support frame
22 Piston cylinder device
22a Piston rod
23 Reciprocating table
24 Ball screw
25 Nut
26 Push member
27 Pusher
40 Superposed body
40a Furrow
50 Cassette member
51 Electrode plate holding section
52 Strut
53 Support plate
54 Slit portion
55 Guide groove
56 Pressing member

The invention claimed is:
1. A method for producing a secondary battery, comprising:

an electrode plate placing step of placing a predetermined number of positive electrode plates or negative electrode plates on a positive electrode plate or negative electrode plate cassette member;

an electrode plate supply step of batchwise supplying the predetermined number of positive electrode plates or negative electrode plates placed on the positive electrode plate or negative electrode plate cassette member to an electrode plate conveying member for positive electrode plates or negative electrode plates;

a zigzag folding step of pushing a separator by a plurality of guide members to fold the separator zigzag;

a multilayer body formation step of inserting the positive electrode plates placed on the electrode plate conveying member for positive electrode plates and the negative electrode plates placed on the electrode plate conveying member for negative electrode plates into respective furrows of the zigzag-folded separator to form a multilayer body having the positive electrode plates and the negative electrode plates superposed alternately via the separator;

a withdrawal step of withdrawing the guide members from inside the respective furrows of the separator; and a pressing step of pressing the multilayer body in a direction in which the positive electrode plates and the negative electrode plates are stacked.

2. The method for producing a secondary battery according to claim 1, further comprising a separator arrangement step of arranging the plurality of guide members zigzag in a vertical direction, and disposing the separator or the superposed body between one row and another row of the guide members, wherein the zigzag folding step is performed by crossing the guide members in a horizontal direction between the rows.

3. A method for producing a secondary battery, comprising:

an electrode plate placing step of placing a predetermined number of positive electrode plates on a positive electrode plate cassette member;

an electrode plate supply step of batchwise supplying the predetermined number of positive electrode plates placed on the positive electrode plate cassette member to an electrode plate conveying member for positive electrode plates;

a zigzag folding step of pushing a superposed body, which has a negative electrode plate sandwiched between two separators, by a plurality of guide members to fold the superposed body zigzag;

a multilayer body formation step of inserting the positive electrode plates placed on the electrode plate conveying member for positive electrode plates into respective furrows of the zigzag-folded superposed body to form a multilayer body having the positive electrode plates and the negative electrode plate superposed alternately via the separators;

a withdrawal step of withdrawing the guide members from inside the respective furrows of the superposed body; and a pressing step of pressing the multilayer body in a direction in which the positive electrode plates and the negative electrode plate are stacked.

4. The method for producing a secondary battery according to claim 3, wherein the electrode plate supply step is performed prior to the zigzag folding step.

5. The method for producing a secondary battery according to claim 3, wherein when a preceding pressing step is performed for producing an immediately preceding secondary battery prior to producing the secondary battery, the electrode plate placing step is performed not later than the preceding pressing step.

6. The method for producing a secondary battery according to claim 3, wherein when a preceding electrode plate placing step is performed for producing an immediately preceding secondary battery, a positive electrode plate or negative electrode plate cassette member being used in the preceding electrode plate placing step, the electrode plate placing step comprises placing the positive electrode plates or the negative electrode plates on the positive electrode plate or negative electrode plate cassette member which is different from the positive electrode plate or negative electrode plate cassette member used in the preceding electrode plate placing step.

7. The method for producing a secondary battery according to claim 1, wherein the electrode plate supply step is performed prior to the zigzag folding step.

8. The method for producing a secondary battery according to claim 3, further comprising a separator arrangement step of arranging the plurality of guide members zigzag in a vertical direction, and disposing the separator or the superposed body between one row and another row of the guide members, wherein the zigzag folding step is performed by crossing the guide members in a horizontal direction between the rows.

9. The method for producing a secondary battery according to claim 1, wherein when a preceding pressing step is performed for producing an immediately preceding secondary battery prior to producing the secondary battery, the electrode plate placing step is performed not later than the preceding pressing step.

10. The method for producing a secondary battery according to claim 1, wherein when a preceding electrode plate placing step is performed for producing an immediately preceding secondary battery, a positive electrode plate or negative electrode plate cassette member being used in the preceding electrode plate placing step, the electrode plate placing step comprises placing the positive electrode plates or the negative electrode plates on the positive electrode plate or negative electrode plate cassette member which is different from the positive electrode plate or negative electrode plate cassette member used in the preceding electrode plate placing step.

11. An apparatus for producing a secondary battery, comprising:

zigzag folding means which has a plurality of guide members arranged zigzag in a vertical direction and which, when a separator is disposed between one row and another row of the guide members, crosses the guide members in a horizontal direction between the rows to fold the separator zigzag;

electrode plate insertion means which has an electrode plate conveying member for positive electrode plates or negative electrode plates for placing thereon a predetermined number of the positive electrode plates or the negative electrode plates, and which moves the electrode plate conveying member for positive electrode plates or negative electrode plates into respective furrows of the separator to insert the positive electrode plates and the negative electrode plates into the respective furrows; and pressing means for pressing a multilayer body, composed of the positive electrode plates and the negative electrode plates superposed alternately via the separator, in a direction in which the electrode plates are stacked, and further comprising supply means which has a positive electrode plate or negative electrode plate cassette member for placing thereon a predetermined number of the positive electrode plates or the negative electrode plates, and which batchwise supplies a plurality of the positive electrode plates or the negative electrode plates placed on the positive electrode plate or negative electrode plate cassette member to the electrode plate conveying member for positive electrode plates or negative electrode plates.

12. The apparatus for producing a secondary battery according to claim 11,
wherein the supply means batchwise supplies the predetermined number of the positive electrode plates or the negative electrode plates from the positive electrode plate or negative electrode plate cassette member to the electrode plate conveying member for positive electrode plates or negative electrode plates not later than the zigzag folding of the separator or the superposed body by the zigzag folding means.

13. The apparatus for producing a secondary battery according to claim 11,
wherein the supply means has a plurality of the positive electrode plate or negative electrode plate cassette members.

14. The apparatus for producing a secondary battery according to claim 11,
wherein the supply means has a pressing member for pressing edge parts of the positive electrode plates or the negative electrode plates placed on the positive electrode plate or negative electrode plate cassette member.

15. The apparatus for producing a secondary battery according to claim 14,
wherein the pressing member presses the edge parts of the positive electrode plates or the negative electrode plates on a side opposite to lead parts thereof.

16. An apparatus for producing a secondary battery, comprising:
zigzag folding means which has a plurality of guide members arranged zigzag in a vertical direction and which, when a superposed body having a negative electrode plate sandwiched between two separators is disposed between one row and another row of the guide members, crosses the guide members in a horizontal direction between the rows to fold the superposed body zigzag;

electrode plate insertion means which has an electrode plate conveying member for positive electrode plates for placing thereon a predetermined number of the positive electrode plates, and which moves the electrode plate conveying member for positive electrode plates into respective furrows of the superposed body to insert the positive electrode plates into the respective furrows; and pressing means for pressing a multilayer body, composed of the positive electrode plates and the negative electrode plate superposed alternately via the separators, in a direction in which the electrode plates are stacked, and further comprising supply means which has a positive electrode plate cassette member for placing thereon a predetermined number of the positive electrode plates, and which batchwise supplies the predetermined number of the positive electrode plates, placed on the positive electrode plate cassette member, to the electrode plate conveying member for positive electrode plates.

17. The apparatus for producing a secondary battery according to claim 16,
wherein the supply means batchwise supplies the predetermined number of the positive electrode plates or the negative electrode plates from the positive electrode plate or negative electrode plate cassette member to the electrode plate conveying member for positive electrode plates or negative electrode plates not later than the zigzag folding of the separator or the superposed body by the zigzag folding means.

18. The apparatus for producing a secondary battery according to claim 16,
wherein the supply means has a plurality of the positive electrode plate or negative electrode plate cassette members.

19. The apparatus for producing a secondary battery according to claim 16,
wherein the supply means has a pressing member for pressing edge parts of the positive electrode plates or the negative electrode plates placed on the positive electrode plate or negative electrode plate cassette member.

20. The apparatus for producing a secondary battery according to claim 19,
wherein the pressing member presses the edge parts of the positive electrode plates or the negative electrode plates on a side opposite to lead parts thereof.

* * * * *